United States Patent [19]

McWilliams

[11] Patent Number: 5,145,659
[45] Date of Patent: Sep. 8, 1992

[54] PREFORMED MATRICES CONTAINING ZEOLITES

[75] Inventor: John P. McWilliams, Woodbury, N.J.

[73] Assignee: Mobil Oil Corporation, Fairfax, Va.

[21] Appl. No.: 439,007

[22] Filed: Nov. 20, 1989

Related U.S. Application Data

[63] Continuation of Ser. No. 124,636, Nov. 24, 1987, abandoned, which is a continuation-in-part of Ser. No. 905,102, Sep. 8, 1986, abandoned.

[30] Foreign Application Priority Data

Apr. 24, 1986 [EP] European Pat. Off. ............ 86303223

[51] Int. Cl.$^5$ ............................................. C01B 33/34
[52] U.S. Cl. ..................... 423/328; 502/63; 502/71; 502/77
[58] Field of Search ............... 423/118, 326, 328, 329, 423/330; 502/68, 80, 84, 77, 63, 71

[56] References Cited

U.S. PATENT DOCUMENTS

| | | | |
|---|---|---|---|
| 3,390,958 | 7/1968 | Howell | 502/68 |
| 3,431,218 | 3/1969 | Plank et al. | 423/118 |
| 3,777,006 | 12/1973 | Rundell et al. | 423/118 |
| 3,976,598 | 8/1976 | Daviditz | 423/118 |
| 4,091,007 | 5/1978 | Dwyer et al. | 423/328 |
| 4,175,114 | 11/1979 | Plank et al. | 423/328 |
| 4,235,753 | 11/1980 | Brown et al. | 423/328 |
| 4,343,723 | 8/1982 | Rogers et al. | 423/328 |
| 4,522,705 | 6/1985 | Chu et al. | 208/120 |
| 4,530,824 | 7/1985 | Arika | 423/328 |
| 4,562,055 | 12/1985 | Arika | 423/329 |

FOREIGN PATENT DOCUMENTS

0202797 11/1986 European Pat. Off. .
2101110 1/1983 United Kingdom ................ 423/118

OTHER PUBLICATIONS

Ser. No. 591,723 filed Mar. 21, 1984.
Ser. No. 629,923 filed Jul. 11, 1984.
Ser. No. 120,899 filed Nov. 16, 1987.

*Primary Examiner*—R. Bruce Breneman
*Attorney, Agent, or Firm*—Alexander J. McKillop; Charles J. Speciale; Marina V. Schneller

[57] ABSTRACT

A process for producing zeolites in a matrix material is described which comprises precipitating an oxide of silicon in the matrix to increase the silica of the matrix which is available for crystallization to a zeolite.

22 Claims, No Drawings

PREFORMED MATRICES CONTAINING ZEOLITES

This is a continuation of copending application Ser. No. 124,636, filed on Nov. 24, 1987, now abandoned, which in turn is a continuation-in-part of application Ser. No. 905,102, filed Sept. 8, 1986, now abandoned.

BACKGROUND OF THE INVENTION

This invention relates to a novel method of preparing pre-formed matrices containing members of a unique class of zeolites. Such unique class of zeolites is characterized by a silica to alumina mole ratio of at least 12. In the instant invention, the crystallization of said zeolites occurs in a pre-formed matrix containing seed crystals and the resultant product is readily useful as a catalyst or adsorbent.

DESCRIPTION OF THE PRIOR ART

Crystalline zeolites have been prepared from mixtures of oxides including sodium oxide, alumina, silica and water. More recently clays and coprecipitated aluminosilicate gels, in the dehydrated form, have been used as sources of alumina and silica in reaction system.

Seeding is a recognized method of initiating crystallization in zeolite synthesis. Generally in seeding, a small quantity of the desired product is injected into a suitable reaction mixture and, with good mixing, these crystals are circulated to provide nucleation sites for the formation of the net product. U.S. Pat. No. 3,671,191 teaches a general seeding technique.

U.S. patent application Ser. No. 841,622 filed Oct. 13, 1977, now U.S. Pat. No. 4,175,114 describes a method for synthesizing a ZSM-5 or ZSM-11 zeolite substantially deficient in nitrogen comprising carrying out the reaction to form said zeolite in the presence of ZSM-5 and/or ZSM-11 seeds with $NH_4OH$ and/or alcohol.

Most commonly, zeolite crystals are incorporated with a binder, i.e. a matrix, to form a catalyst or adsorbent particle. Such matrix is useful not only as a binder, but also to impart greater temperature and impact resistant to the catalyst.

It is recognized in the art that pre-formed catalyst matrix particles can also be transformed under certain conditions into zeolites. The use of matrices to form zeolites is described in many patents including the following: U.S. Pat. Nos. 3,746,659; 3,752,772; 3,773,391; 3,694,152; 3,663,456; 3,650,687; 3,647,718; 3,642,662; 3,545,921; merely to name a few. The most common matrix material used in the prior art to form zeolites is clay, especially kaolin clay.

U.S. Pat. No. 4,091,007 describes an improved method for preparing ZSM-5 by crystallizing a reaction mixture including clay as the major source of alumina, an added source of silica, water and an added source of cations.

The use of pre-formed and high clay content matrix particles places special restrictions on subsequent zeolite crystallization. When clays are used exclusively, the matrix particles tend to be fairly high in aluminum content and siliceous zeolites are not obtained. Another problem in the use of matrix particles is the tendency for these particles to serve simply as a source of nutrients for crystallization quite exterior to, and physically independent of the original matrix.

SUMMARY OF THE INVENTION

The invention is a process of fixing siliceous zeolite crystals in a pre-formed matrix.

In accordance with the invention zeolite crystals are formed within a pre-formed matrix, thus forming a matrix-containing zeolite which can be readily used as a catalyst or adsorbent particle. Use as a catalyst is described in U.S. Pat. No. 4,522,705. It will be appreciated that whereas before the manufacture of catalyst or adsorbent particles comprising a zeolite in a matrix was composed of two general steps, namely zeolite formation and then incorporation of said zeolite in a matrix, the present invention can produce such catalyst or adsorbent particles during zeolite formation with the attendant benefits of shorter zeolite crystallization time, higher zeolite yields and lower catalyst/absorbent manufacturing costs.

In accordance with the present invention, there is now provided a novel method for synthesizing members of a unique class of zeolites within a pre-formed matrix. Such unique class of zeolites is characterized by a silica to alumina mole ratio of at least 12. The instant invention involves the crystallization of said zeolites in a pre-formed matrix which has been modified prior to the zeolite crystallization stage to increase the silicon oxide source therein. The modified matrix is then contacted with the necessary reactants and under proper reaction conditions to form the particular zeolite desired. In some instances, the matrix material itself can serve to provide some of the necessary reactants in a specific zeolite synthesis, e.g. silica, alumina or alkali metal oxide. The final product of this invention is a matrix containing zeolite which can be used directly as a catalyst or adsorbent particle without any further processing.

DETAILED DESCRIPTION OF THE INVENTION

The process of the invention comprises treating a clay material to increase the content thereof in silicon (oxides) available for crystallization in zeolite synthesis and then subjecting the treated clay, as a reactant, in zeolite synthesis, to zeolite forming conditions.

Clay or clay like mineral can be a starting source for zeolites because of the relative availability and low price. Clay is a natural binder material which provides structural strength when calcined. It also is a major source of both silica and alumina for zeolite synthesis, although the $SiO_2/Al_2O_3$ ratio of the starting material is generally too low for high silica zeolites, zeolites in which the silica:alumina molar ratio is greater than 10. It can be made more suitable by appropriate calcination condition prior to crystallization. Calcination can be undertaken at temperatures up to about 600° C.

For zeolite synthesis in which the molar ratio of $SiO_2:Al_2O_3$ is greater than 10, additional oxide source(s) of silicon must be combined with the clay. Relatively large ratios of expensive colloidal silica to clay to provide the necessary $SiO_2/Al_2O_3$ of the starting material, even with calcination, in order to allow synthesis of e.g., ZSM-5. Use of alternate, inexpensive silica sources such as HiSil precipitated silica and soluble silica as waterglass have been shown to seriously diminish the properties of the resulting crystallized product, primarily as products with poor physical strength.

In accordance with the invention, the additional silicon is provided by treating the clay and to thereby form the additional silicon source on and/or in the clay particles.

THE CLAY MATRIX MATERIAL

Useful matrix materials for the pre-formed matrix of this invention include both synthetic and naturally occurring substances, as well as inorganic materials such as clay, silica, and/or metal oxides. The metal oxides may be either naturally occurring or in the form of gelatinous precipitates or gels including mixtures of silica and metal oxides. Non-limiting examples of such porous matrix materials include silica, silica-alumina, silica-thoria, silica-magnesia, silica-zirconia, silica-berylia and silica-titania, as well as ternary compositions, such as silica-alumina-thoria, silica-alumina-zirconia silica-alumina-magnesia and silica-magnesia-zirconia.

Clay material for use as matrix materials in the present invention include compositions composed primarily of clay minerals identified as hydrated aluminum silicates. Said hydrated aluminum silicate clay mineral may have associated therewith one or more metal or metal oxides selected from the group consisting of Group IA, IIA and VIII of the Periodic Table of the Elements (Sargent-Welch Company, 1968). Non-limiting examples of such hydrated aluminum silicate minerals which comprise the major proportion of clays for use in this invention include kaolinite, halloysite, montmorillonite, illite and attapulgite. Clays containing these minerals are represented by such non-limiting examples as fuller's earth (containing attapulgite with some montmorillonite), kaolin (constituted of mainly kaolinite) and bentonite (containing appreciable amounts of montmorillonite and usually having some magnesium and iron associated therewith).

Typical reaction mixtures for the preparation of the unique class of zeolites of the present invention comprise sources of an alkali metal oxide, e.g. a sodium oxide, an oxide of silicon (silica), an oxide of aluminum (alumina), water, and source of an organic nitrogen containing cations, if desired, such as amines or diamines; e.g., butylamine, pentanediamine, hexanediamine; tetraalkylammonium compounds, e.g. tetramethylammonium compounds, tetraethylammonium compounds, tetrabutylammonium compounds, tetrapropylammonium compounds; alkylenediamines, e.g. polymethylenediamine; pyrrolidine tetraureacobalt (II) complexes, etc. In preparation of "extremely highly siliceous" zeolites such as those disclosed in U.S. Pat. No. Re. 29,948, no source of an oxide of aluminum is employed in the reaction mixture.

In many instances, the matrix material may serve as a source of reactants. Thus the matrix may some of the required silica, alumina, or alkali metal. Additionally the matrix material may contain a zeolite with a silica to alumina mole ratio of less than 12, e.g. synthetic faujasite type zeolite.

The clay matrix material may optionally be extruded. Thus, if seed crystals are to be used in the zeolite crystallization stage, the seeds may be incorporated into the matrix; or the seed crystals may be an independent component of the zeolite crystallization reaction mixture. The amount of seeds can range up to 10 weight percent of crystallization reaction mixture. If the seed crystals are incorporated into the matrix, the amount of seeds crystals can range from 0.01 to 2.0 weight percent of the matrix. The seed crystal used depends on the zeolite desired to be produced. For example, ZSM-5 produce ZSM-5 zeolite and ZSM-11 seeds produce ZSM-11 zeolite.

The invention contemplates digestion of the clay material prior to its modification to increase its content in oxides of silicon. Digestion of the clay can include treating a clay slurry with sodium hydroxide.

This has the potential advantage of providing better $SiO_2$ and $Al_2O_3$ sitting in the starting particles used for zeolite synthesis. Partial dissolution of the clay should allow more intimate contact of the additional silica added to the system as well as providing potentially better calcined strength because of the additional Si-O bonding possible.

THE SILICON OXIDE(S) ADDITIVE

Loading the clay with oxides of silicon can be achieved by continuously precipitating that source of silicon in the presence of the clay. Such continuous precipitation provides a silicon containing precipitate, the particle size of the precipitate ranging from 1 to 500 microns, in the absence of the clay.

The precipitate, the added source of silicon in the clay, is formed from a solution of a soluble silicon source. Conveniently, the solution is an aqueous solution of a pH ranging from 9 to 12. The source of soluble silicon can be any soluble silicate and is preferably sodium silicate. It is formed by continuous precipitation from the solution phase. Accordingly, precipitation comprises initiating precipitation and maintaining said precipitation. More particularly, the precipitation step is continuous. Alteration of the composition of the solution of soluble silicon source is undertaken by introducing a precipitating reagent. In one embodiment, the precipitating reagent is a source of acid. Thus, the precipitating reagent can be an acid solution. The acid of the solution may be any mineral acid, such as $H_2SO_4$, HCl, $HNO_3$, etc. The acid solution can have a pH ranging from essentially 0 to about 6. Thus, in one embodiment precipitation can be effected by acid neutralization of a basic solution of a silicate.

Continuous precipitation of the amorphous silicon zeolite precursor comprises continuously introducing the solution of soluble silicon source and continuously introducing the precipitating reagent to a reaction zone while maintaining a molar ratio of silica source to precipitating reagent substantially constant. In one embodiment, the precipitating reagent and the silicate source are introduced simultaneously into the reaction zone.

Other conditions affecting precipitation include time, pH and temperature. The temperature of the precipitation mixture can range from 80° to 300° F. (about 27° C. to 150° C.). The time of contact of the solution of silicon source and the precipitating reagent can range from about 10 minutes to several hours at pH maintained from about 6 to 11. Generally, the precipitate is processed by isolating it, e.g., by filtration, and removing soluble contaminants therefrom, by washing and/or ion exchange. This stage can be considered a solids consolidation step.

By adjusting the relative concentrations, the ratio of silica to clay could be controlled, thus controlling $SiO_2$/$Al_2O_3$ of the ultimate zeolite synthesis. In order to do so, it might be preferable to use an already calcined clay in which some of the contained alumina has been rendered inactive by the calcination process. Alternatively, the clay/silica precursor produce might be calcined to zeolite synthesis to fix the proper $SiO_2$/$Al_2O_3$ of the starting mix. Incorporation of seeds in such a clay/silica precursor may be easily accomplished by mixture with the starting clay slurry.

A potential advantage of this method is the elimination of the need for a spray-driver to form silica microspheres prior to calcination and crystallization.

ZEOLITE SYNTHESIS

Typical reaction mixtures for the preparation of the unique class of zeolites of the present invention comprise sources of an alkali metal oxide, e.g. a sodium oxide, an oxide of silicon (silica), an oxide of aluminum (alumina), water, and optionally but preferably a source of an organic nitrogen containing cations, if desired, such as amines or diamines; e.g., butylamine, pentanediamine, hexanediamine; tetraalkylammonium compounds, e.g. tetramethylammonium compounds, tetraethylammonium compounds, tetrabutylammonium compounds, tetrapropylammonium compounds; alkylenediamines, e.g. polymethylenediamine; pyrrolidine tetraureacobalt (II) complexes, etc.

Seed crystal inclusion, if desired can be in the matrix or in the reaction mixture extrinsic of the matrix. If seeded matrix particles are used they are formed by intimately admixing seed crystals with a clay in a hydrous state (slurry-type material) such as in the form of a hydrosol, hydrogel, wet gelatinous precipitate, or a mixture thereof with subsequent shaping, drying or spray drying by conventional techniques. Alternatively, extension or pelletizing can be employed to form discrete particles. In a particular embodiment of the instant invention, fluid particles can be prepared and used directly as fluid catalysts in FCC units without any further preparation being required. Once the particle is formed, its dimensions and geometry will be essentially fixed and will not be subject to substantial change during crystallization of the zeolite. The seeded matrix particles are then combined with the appropriate reactants under the proper reaction conditions to crystallize the desired zeolite within the matrix.

In general, zeolite reactant solids will be combined with an alkaline aqueous solution containing, if desired, the organic appropriate to facilitate crystallization. On a weight basis, the ratio of said aqueous solution to said solids will normally be between about 0.1 to about 50, preferably between about 1.0 to about 10. Hydroxide concentration in the initial contacting solution will in general, be between about 0.01 and about 3.0 molar, preferably between about 0.1 and 2.0 molar and will be sufficient to ensure a final pH of solid-solution mixture in excess of 7.0. Additionally salts, such as sodium, potassium or quaternary ammonium halides; or organics may be present and in quantities similar the mole ratios to the solid matrix silica and/or alumina contents as cited previously in the references to specific zeolites which are incorporated herein. Generally, organic compounds will be present in the initial contacting solution in concentrations of between about 0.01 and about 2.0 molar, preferably between about 0.05 and 1.0 molar. Crystallization is performed either at atmospheric pressure or under elevated pressure in an autoclave or static bomb reactor at pressures in the range of between about 1 atmosphere and about 60 atmospheres. Crystallization is generally carried out within the temperature range of from about 60° C. to about 250° C., but at lower temperatures, e.g. below about 100° C., crystallization time is longer. Thereafter, the matrix particles containing the crystallized zeolite are separated from the liquid and recovered. Typical reaction conditions consist of heating the reaction mixture and the seeded matrix to a temperature from about 80° to 200° C. for a contact time of from about 1 hour to about 60 days. The more preferred temperature range is from about 95° C. to 160° C. with the amount of time at a temperature in such range being from about 3 hours to about 14 days.

The treatment of the mixture is undertaken until crystals form. The resulting crystalline product is formed within the matrix and is separated from the reaction mixture, as by cooling to room temperature, filtering and water washing. The product so obtained is dried, e.g. at 110° C., for from about 1 hour to about 8 hours. If desired, milder conditions may be employed, e.g. room temperature under vacuum. The final product prepared in accordance with the novel method of this invention is a matrix containing zeolite with the amount of zeolite between about 3% and 60% and preferably about 5% and 40%, with the remainder being the matrix. The final product exhibits unexpected morphology and crystal size.

The zeolites which can be produced hereby include those in which the silica:alumina ratio is at least 12.

Although zeolites with a silica to alumina ratio of at least 12 are useful, it is preferred in some applications to use zeolites having higher silica/alumina ratios of at least about 30. In addition, zeolites as otherwise characterized herein but having very little aluminum, i.e. having silica to alumina mole ratios of 1,600 and higher, are found to be useful and even preferable in some instances. Such "extremely high silica" or "extremely highly siliceous" zeolites are intended to be included within this description. The unique class of zeolites, after activation, acquire an intracrystalline sorptive capacity for normal hexane which is greater than that for water, i.e. they exhibit "hydrophobic" properties. This hydrophobic character can be used to advantage in some instances.

The unique class of zeolites defined herein is exemplified by ZSM-5, ZSM-11, ZSM-12, ZSM-23, ZSM-35, ZSM-38, and other similar materials.

ZSM-5 is described in greater detail in U.S. Pat. No. 3,702,886, U.S. Pat. No. Re. 29,948, U.S. Pat. Nos. 4,139,600 and 4,100,262. The entire descriptions contained within those patents, particularly the methods of preparation and reaction mixtures disclosed are incorporated herein by reference.

ZSM-11 is described in greater detail in U.S. Pat. Nos. 3,709,979 and 4,108,881. The entire description contained within those patents, particularly the methods of preparation and reaction mixtures disclosed are incorporated herein by reference.

ZSM-12 is described in U.S. Pat. No. 3,832,449. That description, and in particular the method of preparation and reaction mixture disclosed therein, is incorporated herein by reference.

ZSM-23 is described in U.S. Pat. No. 4,076,842. The entire content thereof, particularly the method of preparation and the reaction mixture of the disclosed zeolite, is incorporated herein by reference.

ZSM-35 is described in U.S. Pat. Nos. 4,016,245 and 4,107,195. The entire descriptions contained within those patents, particularly the methods of preparation and reaction mixtures disclosed are incorporated herein by reference.

ZSM-38 is more particularly described in U.S. Pat. No. 4,046,859. The description of that zeolite, and particularly the method of preparation and reaction mixture thereof, is incorporated herein by reference.

The specific zeolites described, when prepared in the presence of organic cations, are substantially catalytically inactive, possibly because the intracrystalline free spaced is occupied by organic cations from the forming solution. They may be activated by heating in an inert atmosphere at from about 200° C. to about 900° C., followed by base exchange with ammonium salts, for example, followed by calcination at from about 200° C. to about 900° C., e.g. about 540° C., in air. The presence of organic cations in the forming solution may not be absolutely essential to the formation of this type zeolite; however, the presence of these cations does appear to favor the formation of this special class of zeolite. More generally, it is desirable to activate this type zeolite by base exchange with ammonium salts, for example, followed by calcination in air at from about 200° C. to about 900° C. for from about 15 minutes to about 24 hours.

EXAMPLES

In Example A, formation of the silicon oxide source by a continuous precipitation process is described which is also described in the Examples of Ser. No. 905,102 filed Sep. 8. 1986, now abandoned. In Examples B1-B9, formation of zeolite in clay containing catalyst matrices is described as in Ser. No. 120,899, filed Nov. 16, 1987 (a continuation of Ser. No. 732,035, filed May 8, 1985). In Examples C1-C7, formation of zeolite in clay containing matrices is described as in Ser. No. 591,723, filed Mar. 21, 1984.

EXAMPLE A

The silica precursor, continuously precipitated from a solution can be formed as in Examples of Ser. No. 905,102 filed Sep. 8, 1986, set forth herein.

The silica precipitate precursor for zeolite synthesis was produced using the formulations given in Table 1. Processing was in accordance with the flow diagram shown in FIG. 1. The properties of the silica precursor are given in Table 2. The precursor is made in a continuous manner by neutralizing a sodium silicate solution under carefully controlled conditions. The resulting product is a suspension of agglomerated solids in the shape of microspheres. Because of the size and shape, and because primary agglomeration has already taken place, suspensions of these particles exhibit low viscosities at high solids loadings (30%). This is in marked contrast to an equivalent, non-controlled neutralization which results in solid, non-stirrable mass. The particle size of the precursor ranges between 1–500$\mu$ but the average size is 70$\mu$.

TABLE 1

| PRECURSOR SYNTHESIS* | |
|---|---|
| Volume Basis | |
| Silicate Solution | |
| Sodium Silicate | 100 |
| (Q-Brand 29% SiO$_2$, 9% Na$_2$O) | |
| 50% NaOH | 1.03 |
| H$_2$O (Demineralized) | 98.9 |
| Acid Solution | |
| 24% H$_2$SO$_4$ | 67.0 |

*The two solutions were reacted continuously at 30 min. residence time in a plastic vessel equipped with an overflow and mixer. The vessel was filled with water. The silicate solution and the acid solution are pumped into the vessel in a continuous manner.
The pH was controlled to about 8. The average residence time of the product is 30 minutes, and it is discharged continuously from the vessel by an overflow tube.
The product was collected, filtered and washed with demineralized water to be sulfate free.

TABLE 2

| ANALYSES OF WASHED PRECURSOR | |
|---|---|
| | Wt. Percent |
| Sulfur | 0.005% |
| Silica | 91.3% |
| Alumina | 0.1% |
| Sodium | 1.5% |
| Ash at 1000° F. (542° C.) | 95.53% |

EXAMPLE B1

Two clay-containing catalyst matrices were spray-dried in side-by-side experiments, one containing 1% ZSM-5 crystals, the other containing none. They analyzed as follows:

| | With Crystals | Without |
|---|---|---|
| SiO$_2$/Al$_2$O$_3$ | 5.31 | 5.70 |
| Surface area, m$_2$/g | 204 | 220 |

No ZSM-5 was detected by X-ray diffraction in either material. The same clay-containing catalyst matrices utilized in Example 1 were employed in the following Examples B2–B8. The matrix containing the crystals is referred to as "spray-dried, seeded material" and the matrix without crystals is referred to as "unseeded material".

EXAMPLE B2

Twenty grams of spray-dried, seeded material was combined with a solution of 0.20 g NasOH, 1.33 g TPABr and 2.58 g NaBr in 20 g water. The mixture was placed in a steam chest at 95° C. After one week, X-ray diffraction showed the solid to contain 35% ZSM-5. When the same treatment was given to the unseeded material, the solid contained only 15% ZSM-5. Thus the seeded material gave a grater zeolite yield than the unseed material.

To show that the 35% ZSM-5 sample was not just a physical mixture of crystals with matrix particles, the sample was separated on a 200 mesh screen. The portion passing through 200 mesh analyzed 35% ZSM-5; that retained, 38%.

EXAMPLE B3

Twenty grams of seeded material was treated as in Example B2 except that 40 g water was used. After 1 week, the solid contained 30% ZSM-5 whereas the unseeded material had only 10%.

EXAMPLE B4

Twenty grams of spray-dried, seeded material was combined with a solution of 2.04 of 25% TPS hydroxide in 19 g water. The mixture was placed in a steam chest at 95° C. After one week, X-ray diffraction showed the solid to contain 30% ZSM-5. When the same treatment was used on unseeded material, the solid containing only 20% ZSM-5.

EXAMPLE B5

Eighty grams of spray-dried, seeded material was combined with a solution of 0.8 g NaOH, 10.3 g NaBr and 5.3 g TPABr in 80 g water. The mixture was placed in a 300 cc stainless steel autoclave and heated 4 hours at 160° C. with slow stirring. After cooling, filtering and drying, the product solid contained 16% ZSM-5. When the same treatment was employed with unseeded material, the solid containing only 2% ZSM-5.

EXAMPLE B6

Example B5 was repeated, but with 0.4 g NaOH, 5.3 g TPABr and no NaBr. After 6 hours at 160° C., the seeded material contained 15% ZSM-5; the unseeded sample containing only 2% ZSM-5.

EXAMPLE B7

Example B5 was repeated, but with 120 g solid, 1.2 g NaOH, 7.95 g TPABr and 60 g $H_2O$. After 6 hours at 160° C., the seeded material contained 15% ZSM-5; the unseeded sample containing only 3% ZSM-5.

EXAMPLE B8

This Example will serve to illustrate the necessity of alkalinity. The experiment of Example B5 was repeated, but with no NaOH. After 6 hours at 160° C., no crystallinity was found in either the seeded or unseeded matrix.

EXAMPLE C1

A base catalyst in the shape of an extrudate was prepared by mulling 1000 g of kaolin clay (S.A.F. type, 85% solid), 977 g of a commercial brand of finely divided solid silica known as Hi-Sil (EP type, 87% solid), 90 g of ZSM-5 seeds (0.02 size, 100% solid) and 1500 g of $H_2O$ for about 30 minutes and then extruding the mixture into $\frac{1}{8}$" extrudates. The seeds constituted 5wt. % of the total solids. The dried extrudates were hardened by calcination at 1800° F. for 3 hours in air. One hundred parts of the calcined extrudates were added to a solution of 220 parts of $H_2O$, 4 parts of NaOH. The mixture was then heated in an autoclave at 212° F. for 16 hours and at 300° F. for 4 days. The resultant extrudate was water washed, dried and crushed to determine its crystallinity. The product was determined, by x-ray diffraction analysis, to be 40% by weight ZSM-5. The dried extrudate had a crushing strength of 100 lb/in$^2$. Pore volume was 0.43 ml/g. The $NH_4$ exchangebed, air calcined (3 hours at 1000° F.) extrudate had an alpha activity of 154.

EXAMPLE C2

The same calcined extrudates and solution mixture described in Example C1 were heated in an autoclave at 212° F. for 14 days. The resultant washed and dried extrudates contained about 10% ZSM-5 crystals.

EXAMPLE C3

A base catalyst in the shape of an extrudate was prepared by the method described in Example C1 except that ZSM-5 seeds were not added. The extrudates were calcined and subjected to crystallization by the procedure described in Example C1. The final extrudates contained no ZSM-5 but some unidentified crystalline material.

EXAMPLE C4

A microspherical form of the ZSM-5 aggregate was prepared by spray drying a mixture of 5000 gm of kaolin (U.F. grade), 4800 gm of 30% colloidal $SiO_2$, 283 gm of ZSM-5 seeds (5% weight based on total solids) and 1000 g of $H_2O$. The resultant ZSM-5 microspheres were also precalcined at 1800° F. for 3 hours. The crystallization of microspheres to ZSM-5 followed the same conditions as described in Example C1 for the extrudates. The microsphere product was analyzed, by x-ray diffraction analysis and found to contain 35% by weight ZSM-5.

EXAMPLE C5

The same calcined microspheres and solution mixture described in Example 4 C was heated in an autoclave at 212° F. for 14 days. The final washed and dried extrudates contained about 10% ZSM-5 material.

EXAMPLE C6

A microspherical form of the ZSM-5 aggregate was prepared by spray drying the same composition described in Example C4 except that ZSM-5 seeds were not added. The calcination and crystallization of these microspheres follow the exact same conditions as described in Example C1. The final product contained only some unidentified crystalline material.

EXAMPLE C7

The discrete particle product of Example C4 was steam activated and evaluated in a series of runs where a gas oil was catalytically cracked. The gas oil employed was a sour heavy gas oil. In Run No. 1, this gas oil was cracked with a commercial zeolite-containing cracking catalyst supplied by Filtrol Corporation. In Run NO. 2, 0.5 wt. % of the steam activated product of Example C4 was added to the commercial zeolite cracking catalyst while in Run No. 3, 2 wt. % of the steam activated product of Example C4 was added to the commercial zeolite cracking catalyst. The results of these three runs are presented in Table 4.

TABLE 4

| ZSM-5 added Amount | Commercial Catalyst — — | Commercial Catalyst Plus Ex. 4 Product 0.5 wt. % | Commercial Catalyst Plus Ex. 4 Product 2.0 wt. % |
|---|---|---|---|
| CONDITIONS | | | |
| WHSV | 10.0 | 10.4 | 9.70 |
| C/O Ratio | 2.50 | 2.49 | 2.57 |
| TEMP., °F. | 902 | 896 | 900 |
| CONVERSION, VOL. % | 61.5 | 61.5 | 60.6 |
| $C_5+$ GASOLINE, VOL. % | 53.4 | 53.8 +0.4 | 48.5 −4.9 |
| TOTAL $C_4$'s, VOL. % | 10.1 | 11.6 +1.5 | 16.7 +6.6 |
| DRY GAS, WT. % | 6.6 | 6.6 +0 | 6.3 −0.3 |
| COKE, WT. % | 2.41 | 2.24 −0.17 | 2.8 +0.4 |
| $H_2$, WT. % | 0.12 | 0.11 | 0.09 |
| COKE ON CAT., WT. % | 0.868 | 0.811 | 0.986 |
| RECOVERY, WT. % | 97.3 | 97.3 | 94.8 |
| $C_5+$ GASOLINE, O.N. (R + O) | 84.8 | 85.0 +0.2 | 88.1 +3.3 |

What is claimed is:

1. A process for making a zeolite supported on a matrix comprising
   providing preformed particles of a zeolite catalyst matrix material, wherein said matrix material contains at least one source selected from the group consisting of silica, alumina, and alkali metal;
   increasing the silica content of a matrix material by contacting the matrix material with a solution of a solicate source,
   precipitating said silicate by treating the matrix of increased silicate content with a solution containing a reagent effective to precipitate silicate to provide a source of silicon oxide for zeolite synthesis,
   wherein said source of silicon oxide is formed by providing a precipitating reagent which is effective to precipitate said silicate from said solution; and continuously contacting said solution with said precipitating reagent to effect formation of insoluble precipitate;
   providing a zeolite synthesis reaction mixture, containing said source of silicon oxide or said source of silicon oxide admixed with a source of alumina, and water, wherein the pH of the reaction mixture is greater than 7, wherein the reaction contains seed crystals in an amount ranging from 0 to 10 weight percent of the matrix;
   maintaining said reaction mixture at a temperature of 60° C. to 250° C. until the matrix contains zeolite product in an amount which exceeds that of the seed crystals; and
   recovering said matrix containing zeolite product.

2. The process of claim 1, wherein said preformed particles are extrudates.

3. The process of claim 2, which includes extruding matrix material with said seeds.

4. The process of claim 1, wherein said preformed particles are microspheres.

5. The process of claim 1, wherein said preformed particles are formed by spray drying.

6. The process of claim 1, wherein the matrix is clay.

7. The process of claim 6, wherein the clay is treated with a base prior to silicate contacting.

8. The process of claim 6, wherein the clay is calcined.

9. The process of claim 6, wherein the zeolite is ZSM-5.

10. The process of claim 7, wherein the zeolite is ZSM-5.

11. The process of claim 1, wherein said contacting matrix with a solution of silicate and said treating are undertaken simultaneously.

12. The process of claim 2, wherein said contacting matrix with a solution of silicate and said treating are undertaken simultaneously.

13. The process of claim 1, wherein the reaction mixture comprises a source of silicon or a source of silicon admixed with a source of aluminum,
    wherein the reaction medium has a composition, expressed in terms of molar ratios of oxides as

| | | |
|---|---|---|
| $SiO_2/Al_2O_3$ | greater than 20 | $OH^-/SiO_2$ about .05–.3 |
| $H_2O/SiO_2$ | about 4–20 | |
| $R/Al_2O_3$ | about 0–20 | Seeds 0–10% | wherein R is a source of a primary amine, secondary amine, tertiary amine or quaternary amine, wherein seeds comprise ZSM-5, zeolite beta, or admixtures thereof.

14. The process of claim 11, wherein the Zeolite is ZSM-5.

15. The process of claim 12, wherein the zeolite is ZSM-5.

16. The process of claim 13, wherein the zeolite is ZSM-5.

17. The process of claim 1, wherein the zeolite is ZSM-5.

18. The process of claim 2, wherein the zeolite is ZSM-5.

19. The process of claim 13, wherein the zeolite is ZSM-5.

20. The process of claim 4, wherein the zeolite is ZSM-5.

21. The process of claim 5, wherein the zeolite is ZSM-5.

22. The process of claim 8, wherein the zeolite is ZSM-5.

* * * * *